United States Patent
Speranzon et al.

(10) Patent No.: US 11,205,112 B2
(45) Date of Patent: Dec. 21, 2021

(54) DEEP NEURAL NETWORK-BASED INERTIAL MEASUREMENT UNIT (IMU) SENSOR COMPENSATION METHOD

(71) Applicant: Honeywell International Inc., Morris Plains, NJ (US)

(72) Inventors: Alberto Speranzon, Maple Grove, MN (US); Vijay Venkataraman, Excelsior, MN (US); Andrew Stewart, Chanhassen, MN (US)

(73) Assignee: Honeywell International Inc., Charlotte, NC (US)

( * ) Notice: Subject to any disclaimer, the term of this patent is extended or adjusted under 35 U.S.C. 154(b) by 128 days.

(21) Appl. No.: 16/371,868

(22) Filed: Apr. 1, 2019

(65) Prior Publication Data
US 2020/0311514 A1 Oct. 1, 2020

(51) Int. Cl.
| | |
|---|---|
| *G06N 3/04* | (2006.01) |
| *G06N 3/08* | (2006.01) |
| *G01C 21/16* | (2006.01) |
| *G01C 25/00* | (2006.01) |

(52) U.S. Cl.
CPC .......... *G06N 3/0445* (2013.01); *G01C 21/16* (2013.01); *G01C 25/00* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 5,554,273 A | 9/1996 | Demmin et al. | |
| 9,665,100 B2 * | 5/2017 | Shashua | G05D 1/0278 |
| 10,611,371 B2 * | 4/2020 | Kusano | B60W 60/00274 |
| 2010/0283832 A1 | 11/2010 | Lin | |
| 2017/0132334 A1 * | 5/2017 | Levinson | G06F 30/20 |
| 2018/0053056 A1 * | 2/2018 | Rabinovich | A63F 13/212 |
| 2018/0096259 A1 * | 4/2018 | Andrews | G06T 7/251 |
| 2018/0137642 A1 * | 5/2018 | Malisiewicz | G06T 7/11 |
| 2018/0180420 A1 * | 6/2018 | Korenberg | G01C 21/16 |
| 2019/0056231 A1 | 2/2019 | Bai et al. | |

(Continued)

FOREIGN PATENT DOCUMENTS

| | | |
|---|---|---|
| CN | 101158588 A | 4/2008 |
| CN | 107148553 A | 9/2017 |

(Continued)

OTHER PUBLICATIONS

European Patent Office, "Extended European Search Report from EP Application No. 20166033.9", from Foreign Counterpart to U.S. Appl. No. 16/371,868, filed Sep. 3, 2020, pp. 1 through 8, Published: EP.

(Continued)

*Primary Examiner* — Peter D Nolan
*Assistant Examiner* — Demetra R Smith-Stewart
(74) *Attorney, Agent, or Firm* — Fogg & Powers LLC (57) ABSTRACT

An Inertial Measurement Unit (IMU), method, and navigation system are disclosed. For example, the method includes receiving a plurality of sensor values from an IMU, loading the plurality of sensor values and a plurality of true sensor values into a deep learning algorithm, and training the deep learning algorithm to enhance the accuracy of the plurality of sensor values utilizing the plurality of true sensor values.

15 Claims, 5 Drawing Sheets

(56) References Cited

U.S. PATENT DOCUMENTS

| | | | |
|---|---|---|---|
| 2019/0079536 A1 | 3/2019 | Zhu et al. | |
| 2019/0139205 A1* | 5/2019 | El-Khamy | G06K 9/6256 |
| 2019/0265703 A1* | 8/2019 | Hicok | G06Q 50/30 |
| 2019/0266418 A1* | 8/2019 | Xu | G06K 9/00798 |
| 2019/0298224 A1* | 10/2019 | Rahman | A61B 5/0803 |
| 2020/0160972 A1* | 5/2020 | Beriault | G06N 3/08 |
| 2020/0355503 A1 | 11/2020 | Chen et al. | |

FOREIGN PATENT DOCUMENTS

| | | |
|---|---|---|
| CN | 107290801 A | 10/2017 |
| CN | 107655472 A | 2/2018 |
| CN | 109188026 A | 1/2019 |
| CN | 110749337 A | 2/2020 |
| WO | 0073815 A1 | 12/2000 |

OTHER PUBLICATIONS

Siddakatte et al., "Sensor Auto-Calibration Using Neural Networks For RISS Mechanization During Loss GNSS Outages", 6th ESA International Colloquium on Scientific and Fundamental Aspects of the Galileo, Oct. 25-27, pp. 1-8, Valencia, Spain.

Haarnajoa, "Backprop KF: Learning Discriminative Deterministic State Estimators", 30th Conference on Neural Information Processing Systems (NIPS 2016), pp. 1 through 9, Barcelona, Spain.

Jonschkowski et al., "Differentiable Particle Filters: End-to-End Learning with Algorithmic Priors", May 30, 2018, pp. 1 through 9.

Lee et al., "Multimodal Sensor Fusion with Differentiable Filters", Dec. 23, 2020, pp. 1 through 8.

Das & Roy, "Chapter 5—A Deep Dive Into Deep Learning Techniques for Solving Spoken Language Identification Problems", Intelligent Speech Signal Processing, Academic Press 2019, pp. 87 through 91.

Subasi, "Chapter 3—Machine Learning Techniques", Practical Machine Learning for Data Analysis Using Python, Academic Press 2020, pp. 182 through 183.

* cited by examiner

DEEP NEURAL NETWORK-BASED INERTIAL MEASUREMENT UNIT (IMU) SENSOR COMPENSATION METHOD

BACKGROUND

Inertial Measurement Units (IMUs) are the main components of inertial guidance systems utilized in certain vehicles such as aircraft, unmanned aerial vehicles (UAVs), spacecraft, satellites, waterborne craft, guided missiles, guided munitions and the like. Utilizing a combination of motion sensors such as accelerometers and gyroscopes, IMUs sense and report the motion of the vehicle involved, angular rate and direction of that motion. However, in order to perform optimally, the IMUs' motion sensors (e.g., accelerometers, gyroscopes) must be re-calibrated or "compensated" periodically over a wide range of changing physical conditions (e.g., differing time durations, air temperatures, air pressures, etc.). The existing calibration methodologies for IMU sensor compensation typically utilize least square or polynomial fitting techniques of varying degrees. However, the utility of these techniques depends on the user having a suitable understanding of the physics of the sensors and how environmental conditions, such as temperature and pressure, affect the operation of the sensors and thus the accuracy and reliability of the IMU compensation process.

For example, the (Rate) Table Calibration (TCAL) process is an existing IMU sensor compensation technique. Rate tables are mechanical tables that are utilized to test and calibrate gyroscope and accelerometer sensors for IMUs and other inertial guidance systems. The TCAL process utilizes the following parametric model for an IMU:

$$x_{comp} = C \cdot (sf \cdot x_{raw} + \text{bias}) \quad (1)$$

where $x_{raw}$ represents either raw acceleration data (e.g., from an accelerometer) or raw angular rate data (e.g., from a gyroscope). The parameter $C \in \mathbb{R}^{3 \times 3}$ represents the (e.g., three-dimensional) misalignment matrix, whose entries, Cij, represent the misalignment between the i-th and j-th axis. The scale factor in Equation (1) can be represented in matrix form as:

$$sf = \left(I + \begin{bmatrix} sf_x & 0 & 0 \\ 0 & sf_y & 0 \\ 0 & 0 & sf_z \end{bmatrix}\right) \in \mathbb{R}^{3 \times 3} \quad (2)$$

where the scale factor parameter in Equation (1) is split over the different axis, yielding Equation (2). As indicated above, the TCAL method utilizes a least-squares regression algorithm to find the optimal parameter values by minimizing the sum of the squared residuals resulting from differences in the observed (raw) data and the anticipated data based on a model. However, as discussed above, the TCAL IMU compensation technique requires the user to suitably comprehend the physical characteristics of the sensors (e.g., gyroscopes and accelerometers) being utilized, and also how the existing environmental conditions (e.g., air temperature and pressure) affect the operation of the sensors and thus the accuracy and reliability of the IMU sensor compensation process involved.

For the reasons stated above and for other reasons stated below which will become apparent to those skilled in the art upon reading and understanding the specification, there is a need in the art for more accurate and reliable IMU sensor compensation.

SUMMARY

Embodiments disclosed herein provide a deep neural network-based methodology for IMU sensor compensation that is significantly more accurate than existing IMU sensor compensation techniques, which will be understood by reading and studying the following specification.

DRAWINGS

Embodiments of the present disclosure can be more easily understood and further advantages and uses thereof more readily apparent, when considered in view of the description of the preferred embodiments and the following figures in which.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Figure 1:
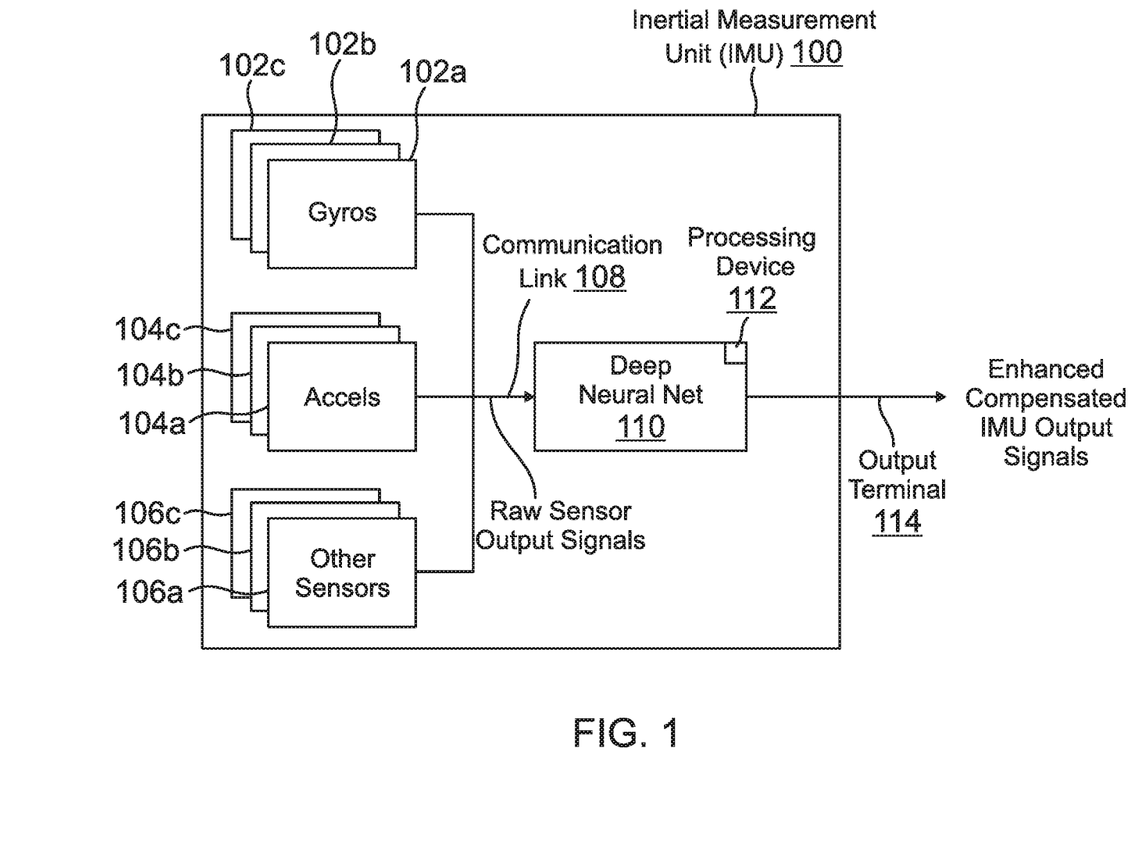
FIG. 1 is a schematic block diagram depicting an Inertial Measurement Unit (IMU) that can be utilized to implement one example embodiment of the present invention.

FIG. 1 is a schematic block diagram depicting an Inertial Measurement Unit (IMU) 100, which can be utilized to implement one example embodiment of the present invention. For this exemplary embodiment, the IMU 100 includes a plurality of gyroscopes 102a through 102c, a plurality of accelerometers 104a through 104c, and a plurality of other types of sensors 106a through 106c. For example, in this embodiment, the gyroscopes 102a through 102c comprise a 3-axis gyroscope that measures the angular velocity along the X, Y and Z axes of the IMU 100. Also, for example, in this embodiment, the accelerometers 104a through 104c comprise a 3-axis accelerometer that measures the acceleration or rate of change of the velocity along the X, Y and Z axes of the IMU 100. Furthermore, in this exemplary embodiment, the other sensors 106a through 106c can be non-motion sensors utilized to measure, for example, temperature changes, structural changes (e.g., strain gauges), changes in sensed magnetic fields (e.g., magnetic field of the Earth), and the like. Notably, although three "other sensors" 106a through 106c are shown in this example embodiment, the actual number of these sensors is not intended to be limited to a specific number and, as such, the "other sensors" can be implemented utilizing more or less than three (e.g., non-motion) sensors. Also, although three gyroscopes 102a through 102c and three accelerometers 104a through 104c are shown in this example embodiment, the actual number of these sensors is not intended to be limited to a specific number and, as such, both the gyroscopes and accelerometers can be implemented utilizing more or less than three sensors.

For this example embodiment, the output (e.g., raw) signals from the gyroscopes 102a through 102c, accelerometers 104a through 104c, and other sensors 106a through 106b are coupled via a suitable (e.g., analog or digital) communication link 108 to an input of a deep neural network (DNN) 110. For example, the DNN 110 can be implemented utilizing a deep learning algorithm stored in, and processed by a processing device 112, which can be, for example, a data processor, microprocessor, microcontroller, computer processor, or other suitable processing device. As such, as described in detail below, the DNN 110 generates enhanced compensated sensor output signals at the output terminal 114 of the IMU 100.

Figure 2:
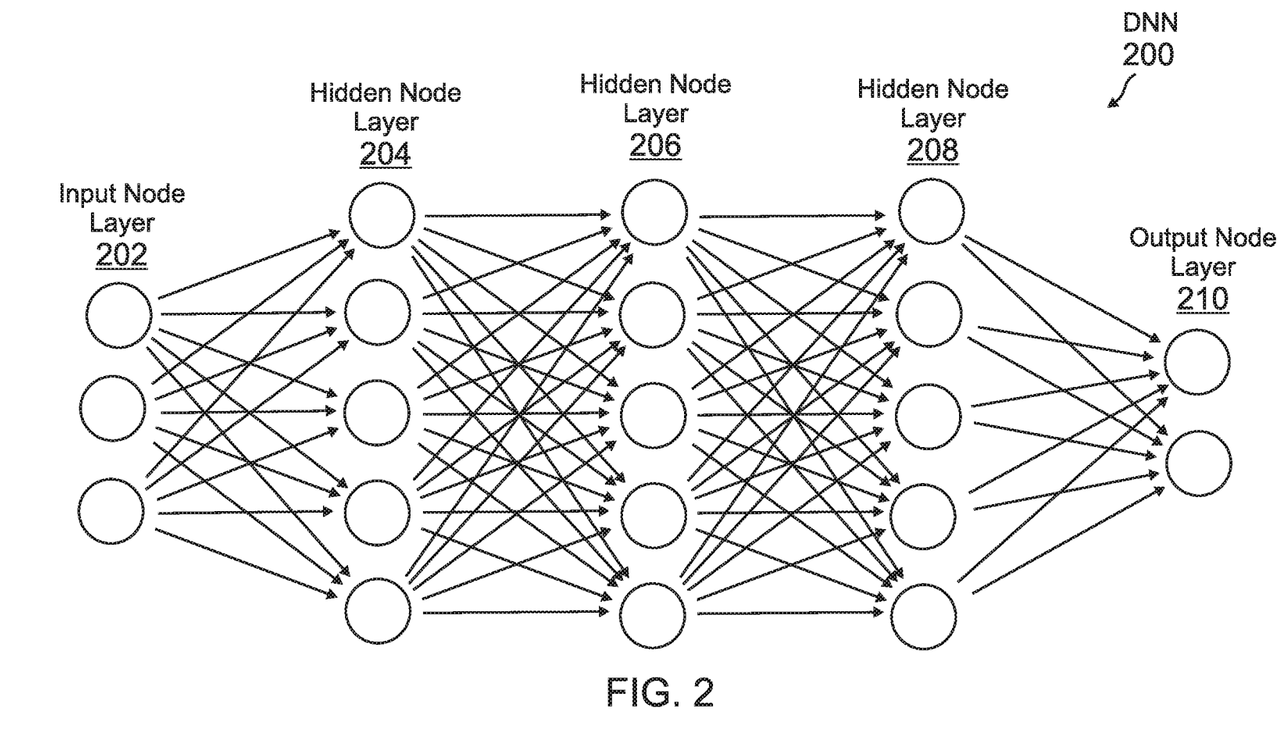
FIG. 2 is a schematic block diagram depicting a Deep Neural Network (DNN) that can be utilized to implement one example embodiment of the present invention.

FIG. 2 is a schematic block diagram depicting a DNN 200, which can be utilized to implement one example embodiment of the present invention. For this exemplary embodiment, the DNN 200 is implemented as a "stacked" neural network (e.g., network composed of numerous node layers). For example, the DNN 200 includes an input node layer 202, a plurality of hidden node layers 204, 206, 208, and an output node layer 210. Each node layer includes a plurality of nodes. Each node is a computational entity (e.g., loosely patterned on a neuron in the brain) that can be triggered to have "high activation" or "low activation" in response to an input. A node layer (e.g., 202, 204, 206, 208 or 210) is a row of these computational entities that can have "high activation" or "low activation" as an input signal is fed through the DNN 200. The output of each node layer is simultaneously the input to the subsequent node layer.

Notably, for this example embodiment, each node in the node layers 202, 204, 206, 208 and 210 combines the signal/data at its input with a respective set of coefficients or weights that either amplify or dampen that input signal/data. Consequently, each node in the node layers 202, 204, 206, 208 and 210 thereby assigns significance (e.g., weight) to its respective input with respect to the task(s) the DNN algorithm is attempting to learn.

Notably, for this example embodiment, the DNN 200 is implemented as a learning algorithm. For example, during an exemplary learning process, the DNN 200 can be trained utilizing ground truth (e.g., labeled) data provided, for example, by one or more high quality, calibrated sensors (e.g., operating under similar conditions as those of the sensors providing the raw data), or data provided by an external truth system (e.g., calibrated rate table). For example, in one embodiment, the learning process for the DNN 200 can be accomplished by utilizing ground truth (e.g., labeled) data for 70% of the data being input to the DNN, and the compensation process for the DNN 200 can be accomplished by utilizing raw sensor data for the remaining 30% of the data being input to the DNN. However, in another embodiment, any suitable percentages other than 70% for the learning process and 30% for the compensation process can be utilized. In any event, for this example embodiment, the input-weighted products of the nodes in the node layers 202, 204, 206, 208 and 210 are summed, and the sum of these products is passed through the node's activation function to determine whether, and to what extent, that input data (e.g., raw sensor data) can progress further through the DNN to affect the ultimate outcome.

More precisely, referring again to FIG. 1, the DNN 110 is a function approximator that can map inputs to outputs by finding correlations between them. Notably, the DNN learns to approximate unknown functions such as, for example, the function f(x)=y, between any input x and any output y, if the input and output are related at all by any correlation. During the learning process, the DNN finds the correct manner of transforming the input "x" into the output "y". For example, referring to Equation (2), the input to the DNN can be represented in matrix form as $X=\mathbb{R}^n$, and the (e.g., approximate) output of the DNN can be represented in matrix form as $Y=\mathbb{R}^m$. As such, the approximated output, Y, of the DNN can be represented as:

$$Y \approx W_4(f_3(W_3(f_2(W_2(f_1(W_1X+B_1)+B_2)+W_3)+B_4 \quad (3)$$

where the parameter, $f_3$, represents the activation function, and the function $f_1(W_1X+B_1)$ represents the function of the first column (e.g., layer) of nodes of the DNN having a weighted input $W_1X$ and a bias $B_1$. Similarly, the parameter $f_2(W_2(f_1(W_1X+B_1)+B_2)$ represents the function of the second column (e.g., layer) of nodes with the weight $W_2X$ and bias $B_2$ added, and so on for the additional columns or layers. In other words, the output, Y, is an approximation of the sum of the weighted inputs, X, for all of the nodes in the DNN 110. As described earlier, the input-weight products are summed, and the sum of these products is passed through the node's activation function to determine whether, and to what extent, a particular input should progress further through the neural network to affect the ultimate outcome.

At this point, it is useful to note that, in a different embodiment, instead of utilizing a neural network (e.g., DNN) to compensate sensed input signals/data (e.g., X) at single time instances (e.g., as described above), a neural network that processes/compensates a continuum of the sensed input signals or data over a period of time could be utilized. For example, in one embodiment, a recurrent neural network (RNN) could be utilized to compensate a continuum of sensor input signals or data received over a period of time.

In summary, referring again to FIG. 1, for this example embodiment, the raw sensor output signals on the communication link 108 can be represented as the weighted inputs, X, in Equation (3), and the enhanced compensated IMU signals at the output terminal 114 can be represented as the output approximations, Y. As such, in accordance with the above-described teachings, a DNN-based methodology is provided herein to implement an IMU sensor compensation technique that is significantly more accurate than existing IMU sensor compensation techniques. For example, users can implement IMU compensation without being required to understand the physical characteristics of the sensors or the environmental conditions under which they are being operated.

Figure 3:
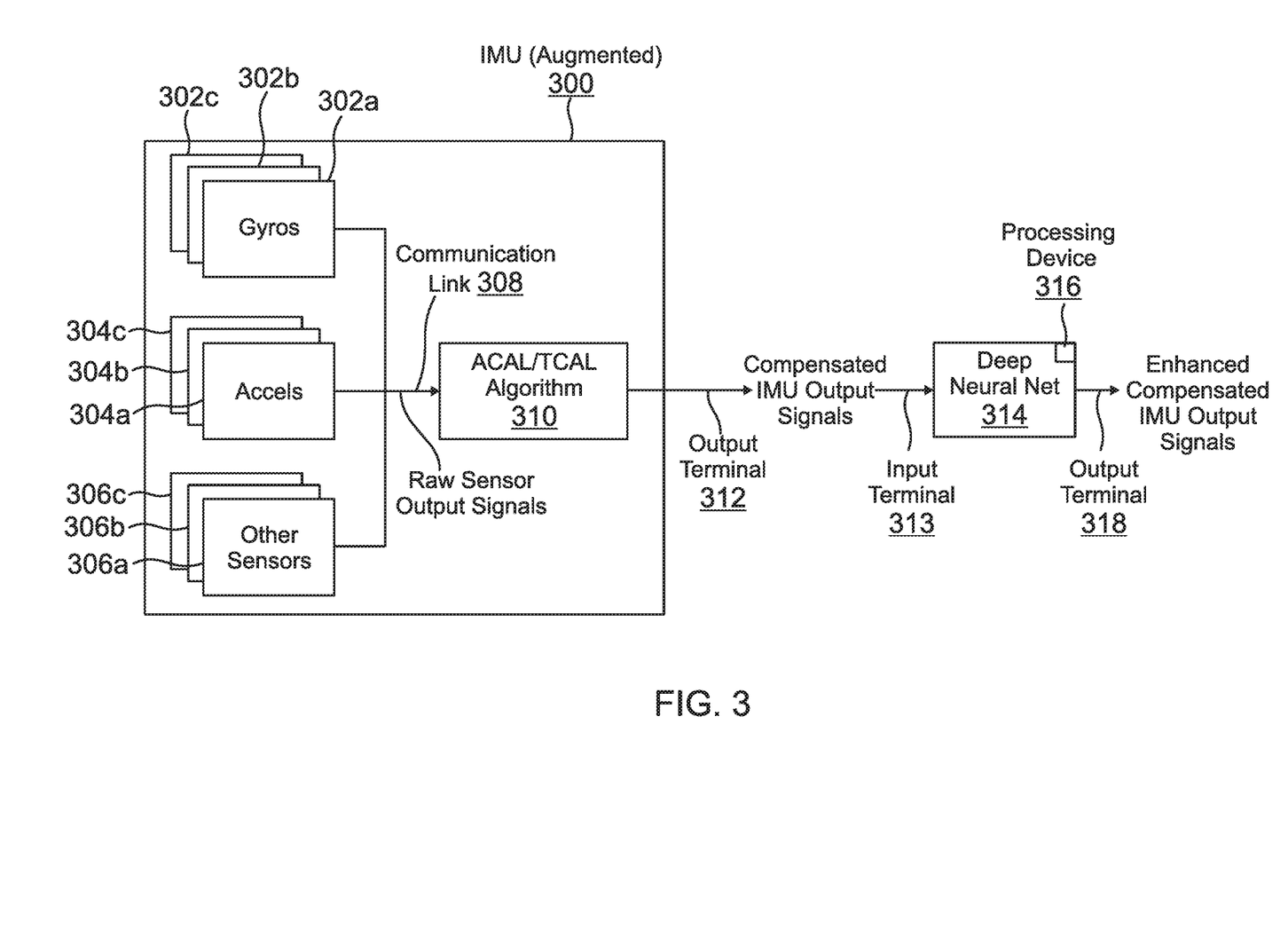
FIG. 3 is a schematic block diagram depicting a second Inertial Measurement Unit (IMU) that can be utilized to implement one example embodiment of the present invention.

FIG. 3 is a schematic block diagram depicting a second Inertial Measurement Unit (IMU) 300, which can be utilized to implement one example embodiment of the present invention. For this exemplary embodiment, the IMU 300 includes a plurality of gyroscopes 302a through 302c, a plurality of accelerometers 304a through 304c, and a plurality of other types of sensors 306a through 306c. For example, in this embodiment, the gyroscopes 302a through 302c can comprise a 3-axis gyroscope that measures the angular velocity along the X, Y and Z axes of the IMU 300. Also, for example, in this embodiment, the accelerometers 304a through 304c can comprise a 3-axis accelerometer that measures the acceleration or rate of change of the velocity along the X, Y and Z axes of the IMU 300. Furthermore, in this exemplary embodiment, the other sensors 306a through 306c can be non-motion sensors utilized to measure, for example, temperature changes, structural changes (e.g., strain gauges), changes in sensed magnetic fields (e.g., magnetic field of the Earth), and the like. Notably, although three "other sensors" 306a through 306c are shown in this example embodiment, the actual number of these sensors is not intended to be limited to a specific number and, as such, the "other sensors" can be implemented utilizing more or less than three (e.g., non-motion) sensors. Also, although three gyroscopes 302a through 302c and three accelerometers 304a through 304c are shown in this example embodiment, the actual number of these sensors is not intended to be limited to a specific number and, as such, the gyroscopes and accelerometers can be implemented utilizing more or less than three sensors.

For this example embodiment, the output (e.g., raw) signals from the gyroscopes 302a through 302c, accelerometers 304a through 304c, and other sensors 306a through 306c are coupled via a suitable (e.g., analog or digital) communication link 308 to an input of an Automated Calibration/Table Calibration (ACAL/TCAL) algorithm 310. For example, in one embodiment, the ACAL/TCAL algorithm 310 can be implemented utilizing the parameters described above with respect to Equations (2) and (3) and stored in, and processed by a suitable data processor, such as, for example, a microprocessor, microcontroller, computer processor, or other suitable processing device. Specifically, the TCAL process utilizes the parameters depicted in Equation (1) above to describe the parametric model for an IMU:

$$x_{comp} = C \cdot (sf \cdot x_{raw} + \text{bias})$$

where $x_{raw}$ represents either raw acceleration data (e.g., from an accelerometer) or raw angular rate data (e.g., from a gyroscope). The parameter $C \in \mathbb{R}^{3 \times 3}$ represents the (e.g., three-dimensional) misalignment matrix, and the parameters Cij represent the misalignment between the i-th and j-th axis. As such, the scale factor in Equation (1) can be represented in matrix form as depicted in Equation (2):

$$sf = \left( I + \begin{bmatrix} sf_x & 0 & 0 \\ 0 & sf_y & 0 \\ 0 & 0 & sf_z \end{bmatrix} \right) \in \mathbb{R}^{3 \times 3}$$

where the scale factor parameter in Equation (1) is split for each axis, yielding Equation (2). As indicated above, the TCAL method utilizes a least-squares regression algorithm to find the optimal parameter values by minimizing the sum of the squared residuals resulting from differences in the observed (raw) data and the anticipated data based on a model. As such, for this example embodiment, the ACAL/TCAL algorithm 310 is utilized to generate compensated sensor output signals at the output terminal 312 of the IMU 300.

Notably, for this exemplary embodiment, the IMU 300 is referred to as an "augmented IMU" because the signals generated at the output terminal 312 of the IMU 300 are coupled to the input terminal 313 of a DNN 314 that is external to and thus augmented to the IMU. In any event, for this example embodiment, the DNN 314 is implemented utilizing a suitable deep learning algorithm stored in, and processed by the processing device 316, which can be, for example, a data processor, microprocessor, microcontroller, computer processor, or other suitable processing device. As such, as described above with respect to the DNN 110 depicted in FIG. 1, the DNN 314 is configured to generate "enhanced" compensated sensor output signals at the output terminal 318.

Figure 4:
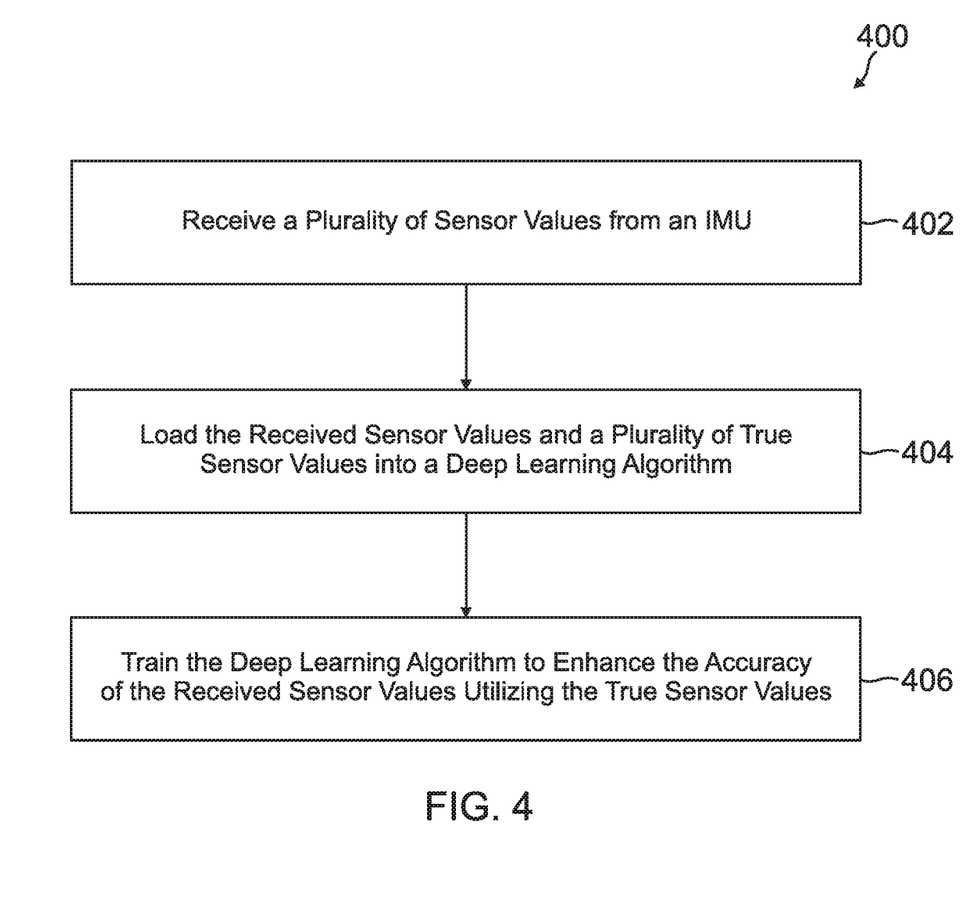
FIG. 4 is a flow diagram illustrating a method that can be utilized to implement one example embodiment of the present invention.

FIG. 4 is a flow diagram illustrating a method 400, which can be utilized to implement one example embodiment of the present invention. Referring to FIG. 4 and the example embodiments depicted in FIGS. 1-3, the exemplary method begins with receiving a plurality of sensor values from an IMU (402). For example, the plurality of received sensor values can be the raw sensor output signals provided on the communication link 108 depicted in FIG. 1. Also, for example, the plurality of received sensor values can be the compensated IMU output signals provided on the output terminal 312 of the augmented IMU 300 depicted in FIG. 3. Next, the received sensor values are loaded along with a plurality of true sensor values into a deep learning algorithm (404). For example, as described above with respect to FIG. 1, ground truth data provided by one or more high quality, calibrated sensors or from an external truth system (e.g., calibrated rate table) are loaded into the DNN 110 along with the raw sensor input data received from the communication link 108. Next, the method trains the deep learning algorithm to enhance the accuracy of the plurality of sensor values utilizing the plurality of true sensor values (406). For example, as described above with respect to FIG. 1, during the learning process for the DNN 110, 70% of the input data can be ground truth (e.g., labeled) data utilized by the DNN 110 for the learning process, and the remaining 30% of the input data can be the received raw sensor data for the compensation process. The method is then terminated.

Figure 5:
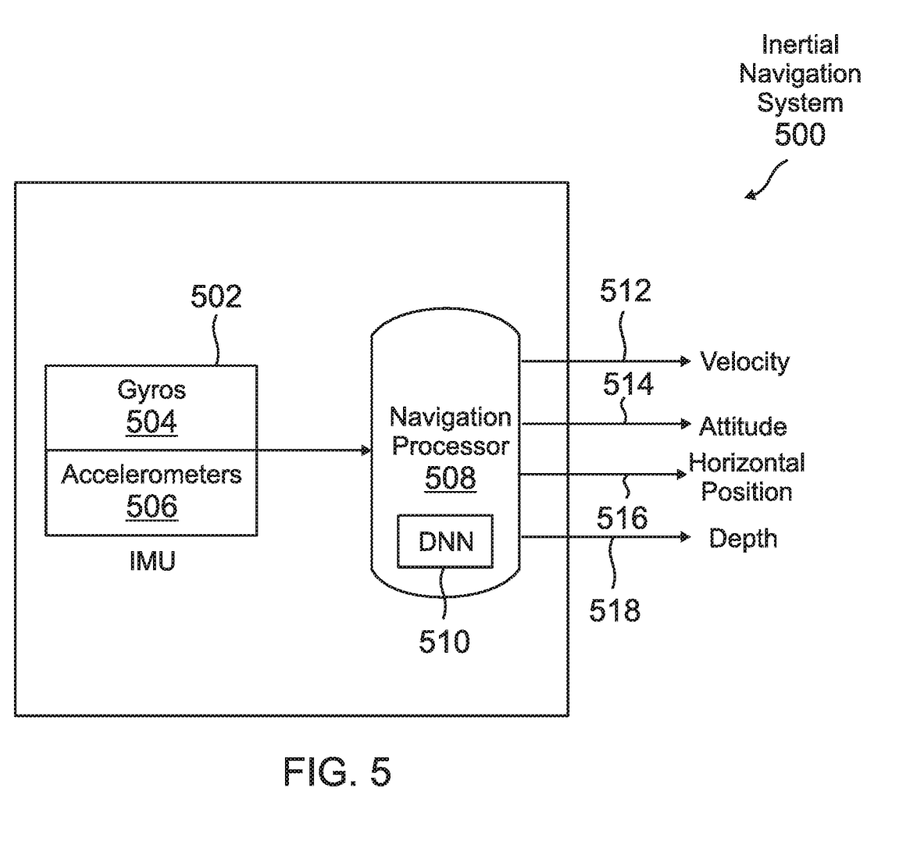
FIG. 5 is a schematic block diagram depicting a navigation system that can be utilized to implement one example embodiment of the present invention In accordance with common practice, the various described features are not drawn to scale but are drawn to emphasize features relevant to the present disclosure. Reference characters denote like elements throughout the figures and text.

FIG. 5 is a schematic block diagram depicting a navigation system 500, which can be utilized to implement one example embodiment of the present invention. For this exemplary embodiment, the navigation system 500 is depicted as an inertial navigation system (INS). However, the system 500 depicted in FIG. 5 is provided for illustrative purposes and not intended to limited the scope of the present invention only to an INS. In other words, in some embodiments, the system 500 could be implemented utilizing any suitable navigation system other than an INS. In any event, referring to FIG. 5, the exemplary system 500 includes an IMU 502. The IMU 502 includes, but is not limited to, one or more gyroscopes 504 and one or more accelerometers 506. The one or more gyroscopes 504 and one or more accelerometers 506 generate respective sensor signals, which are coupled to a navigation processor 508 for data/signal processing, For example, in this embodiment, the gyroscopes 504 can comprise a 3-axis gyroscope that measures the angular velocity along the X, Y and Z axes of the IMU 502. Also, for example, in this embodiment, the accelerometers 506 can comprise a 3-axis accelerometer that measures the acceleration or rate of change of the velocity along the X, Y and Z axes of the IMU 502. The navigation processor 508 stores and processes a deep learning algorithm (e.g., DNN) 510, which is configured to receive at its input raw sensor signals/values from the one or more gyroscopes 504 and one or more accelerometers 506, and generate at its output enhanced compensated IMU signals. In turn, for this example embodiment, the navigation processor 508 utilizes the enhanced compensated IMU signals to generate enhanced accuracy navigation information at the output of the navigation system 500, such as, for example, the parameters of velocity 512, attitude 514, horizontal position 516, and depth 518 as shown.

Notably, in accordance with the teachings of the description above, in one example embodiment, a baseline DNN or RNN can be trained for a specific family of IMUs (e.g., IMUs of one family may share subcomponents or devices such as accelerometers/gyroscopes from the same manufacturer). For example, a DNN or RNN may be trained utilizing large quantities of data from multiple devices (e.g., sensors, labeled data, etc.) over time to establish a baseline neural network. Once such a baseline (e.g., trained) neural network is established, for any new device (e.g., IMU) manufactured for the same family, a less detailed (e.g., smaller) calibration procedure than usual can be performed, for example, utilizing a significantly smaller number than usual of ground truth data test points to fine tune the DNN or RNN to this new device (e.g., IMU).

The methods and techniques described above may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory or other tangible, non-transitory storage medium or media. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks, magneto-optical disks, and DVD disks. Any of the foregoing may be supplemented by, or incorporated in, specially-designed application-specific integrated circuits (ASICs), Field Programmable Gate Arrays (FGPAs) or graphics processing units (GPUs).

It should be understood that elements of the above described embodiments and illustrative figures may be used in various combinations with each other to produce still further embodiments which are explicitly intended as within the scope of the present disclosure.

EXAMPLE EMBODIMENTS

Example 1 includes a method, comprising: receiving a plurality of sensor values from an Inertial Measurement Unit (IMU); loading the plurality of sensor values and a plurality of true sensor values into a deep learning algorithm; and training the deep learning algorithm to enhance the accuracy of the plurality of sensor values utilizing the plurality of true sensor values.

Example 2 includes the method of Example 1, further comprising deploying the deep learning algorithm on a processing device and thereby further enhancing the accuracy of the plurality of sensor values.

Example 3 includes the method of any of Examples 1-2, wherein the receiving the plurality of sensor values comprises receiving one or more output signals from one or more gyroscopes, one or more accelerometers or one or more other sensors.

Example 4 includes the method of any of Examples 1-3, wherein the loading the plurality of sensor values and the plurality of true sensor values into the deep learning algorithm comprises loading the plurality of sensor values and plurality of true sensor values into a deep neural network (DNN) or a recurrent neural network (RNN).

Example 5 includes the method of any of Examples 1-4, wherein the loading the plurality of sensor values and the plurality of true sensor values into the deep learning algorithm comprises loading the plurality of true sensor values as a first percentage of inputs to the deep learning algorithm, and the loading the plurality of sensor values into the deep learning algorithm comprises loading the plurality of sensor values as a second percentage of the inputs to the deep learning network.

Example 6 includes the method of any of Examples 1-5, wherein the loading the plurality of true sensor values comprises loading ground truth data.

Example 7 includes the method of Example 6, wherein the loading the ground truth data comprises loading signal values received from at least one calibrated sensor.

Example 8 includes the method of any of Examples 6-7, wherein the loading the ground truth data comprises loading signal values received from a rate table.

Example 9 includes the method of any of Examples 1-8, wherein the loading the plurality of sensor values comprises loading a plurality of compensated IMU output signals into the deep learning algorithm.

Example 10 includes the method of any of Examples 1-9, wherein the training the deep learning algorithm comprises the deep learning algorithm utilizing ground truth data for substantially 70% of input data for learning, and utilizing sensor data for substantially 30% of the input data for sensor compensation.

Example 11 includes an Inertial Measurement Unit (IMU), comprising: one or more sensors configured to generate a plurality of acceleration values for the IMU; one or more sensors configured to generate a plurality of angular rate values for the IMU; and a DNN configured to receive the plurality of acceleration values and the plurality of angular rate values and generate a plurality of enhanced compensated signals at an output of the IMU.

Example 12 includes the IMU of Example 11, wherein the DNN is implemented utilizing a processing device.

Example 13 includes the IMU of any of Examples 11-12, wherein the DNN comprises a deep learning algorithm.

Example 14 includes the IMU of any of Examples 11-13, wherein the one or more sensors configured to generate the plurality of acceleration values for the IMU comprises one or more accelerometers, and the one or more sensors configured to generate the plurality of angular rate values for the IMU comprises one or more gyroscopes.

Example 15 includes the IMU of any of Examples 11-14, wherein the IMU further comprises an augmented IMU including a table calibration algorithm (ACAL/TCAL) interposed between the plurality of sensors and the DNN or a recurrent neural network (RNN), wherein the table calibration algorithm is configured to receive the plurality of acceleration values and the plurality of angular rate values and generate a plurality of compensated IMU output signals, and the DNN or the RNN is configured to receive the plurality of compensated IMU output signals and generate a plurality of enhanced compensated IMU output signals.

Example 16 includes the IMU of any of Examples 11-15, wherein the IMU further comprises one or more non-motion sensors.

Example 17 includes a navigation system, comprising: an IMU, wherein the IMU includes one or more one or more sensors configured to generate a plurality of acceleration values associated with a position of the IMU, and one or more sensors configured to generate a plurality of angular rate values associated with the position of the IMU; and a DNN configured to receive the plurality of acceleration values and the plurality of angular rate values and generate a plurality of enhanced compensated signals at an output of the IMU; and a navigation processor configured to receive the enhanced compensated signals from the DNN and output one or more navigation parameters in response to the received enhanced compensated signals.

Example 18 includes the navigation system of Example 17, wherein the DNN comprises a deep learning algorithm implemented utilizing a processing device.

Example 19 includes the navigation system of any of Examples 17-18, wherein the DNN comprises a recurrent neural network (RNN).

Example 20 includes the navigation system of any of Examples 17-19, wherein the one or more sensors configured to generate the plurality of acceleration values comprises one or more accelerometers, and the one or more sensors configured to generate the plurality of angular rate values comprises one or more gyroscopes.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method, comprising:
   receiving a plurality of sensor values from an Inertial Measurement Unit (IMU);
   loading the plurality of sensor values and a plurality of true sensor values into a deep learning algorithm deployed in one or more processors; and
   training the deep learning algorithm to enhance the accuracy of output signals of the IMU utilizing the plurality of true sensor values,
   wherein receiving the plurality of sensor values comprises receiving one or more raw output signals from one or more gyroscopes, one or more accelerometers, and one or more non-motion sensors,
   wherein loading the plurality of true sensor values comprises loading ground truth data including signal values from a rate table.

2. The method of claim 1, wherein the loading the plurality of sensor values and the plurality of true sensor values into the deep learning algorithm comprises loading the plurality of sensor values and plurality of true sensor values into a deep neural network (DNN) or a recurrent neural network (RNN).

3. The method of claim 1, wherein the loading the plurality of sensor values and the plurality of true sensor values into the deep learning algorithm comprises loading the plurality of true sensor values as a first percentage of inputs to the deep learning algorithm, and the loading the plurality of sensor values into the deep learning algorithm comprises loading the plurality of sensor values as a second percentage of the inputs to the deep learning network.

4. The method of claim 1, wherein the loading the ground truth data comprises loading signal values received from at least one calibrated sensor.

5. The method of claim 1, wherein the loading the plurality of sensor values comprises loading a plurality of compensated IMU output signals into the deep learning algorithm.

6. The method of claim 1, wherein the training the deep learning algorithm comprises the deep learning algorithm utilizing ground truth data for substantially 70% of input data for learning, and utilizing sensor data for substantially 30% of the input data for sensor compensation.

7. An Inertial Measurement Unit (IMU), comprising:
   one or more sensors configured to generate a plurality of acceleration values for the IMU;
   one or more sensors configured to generate a plurality of angular rate values for the IMU;
   one or more sensors configured to measure one or more non-motion values, wherein the non-motion values include at least one of: temperature, strain about an axis of the IMU, and magnetic field; and
   a deep neural network (DNN) configured to receive the plurality of acceleration values, the plurality of angular rate values, and the one or more non-motion values, and generate a plurality of enhanced compensated signals at an output of the IMU.

8. The IMU of claim 7, wherein the DNN is implemented utilizing a processing device.

9. The IMU of claim 7, wherein the DNN comprises a deep learning algorithm.

10. The IMU of claim 7, wherein the one or more sensors configured to generate the plurality of acceleration values for the IMU comprises one or more accelerometers, and the one or more sensors configured to generate the plurality of angular rate values for the IMU comprises one or more gyroscopes.

11. The IMU of claim 7, wherein the IMU further comprises an augmented IMU including a table calibration algorithm (ACAL/TCAL) interposed between the plurality of sensors and the DNN or a recurrent neural network (RNN), wherein the table calibration algorithm is configured to receive the plurality of acceleration values and the plurality of angular rate values and generate a plurality of compensated IMU output signals, and the DNN or the RNN is configured to receive the plurality of compensated IMU output signals and generate a plurality of enhanced compensated IMU output signals.

12. The IMU of claim 7, wherein the IMU further comprises one or more non-motion sensors.

13. A navigation system, comprising:
   an inertial measurement unit (IMU), wherein the IMU includes one or more one or more sensors configured to generate a plurality of acceleration values associated with a position of the IMU, and one or more sensors configured to generate a plurality of angular rate values associated with the position of the IMU;
   a deep neural network (DNN) configured to receive the plurality of acceleration values and the plurality of angular rate values and generate a plurality of enhanced compensated signals at an output of the IMU, wherein the DNN comprises a recurrent neural network (RNN); and a navigation processor configured to receive the enhanced compensated signals from the DNN and output one or more navigation parameters in response to the received enhanced compensated signals.

14. The navigation system of claim 13, wherein the DNN comprises a deep learning algorithm implemented utilizing a processing device.

15. The navigation system of claim 13, wherein the one or more sensors configured to generate the plurality of acceleration values comprises one or more accelerometers, and the one or more sensors configured to generate the plurality of angular rate values comprises one or more gyroscopes.

* * * * *